(12) United States Patent
Kaneshima et al.

(10) Patent No.: US 9,611,344 B2
(45) Date of Patent: *Apr. 4, 2017

(54) VINYL ALCOHOL POLYMER, METHOD FOR PRODUCING SAME, AND COMPOSITION AND COATING AGENT CONTAINING VINYL ALCOHOL POLYMER

(71) Applicant: KURARAY CO., LTD., Kurashiki-shi (JP)

(72) Inventors: Takuma Kaneshima, Kurashiki (JP); Yusuke Amano, Kurashiki (JP); Keisuke Morikawa, Kurashiki (JP); Naoki Fujiwara, Okayama (JP); Kensuke Nagashima, Kurashiki (JP); Katsuji Ujita, Tainai (JP)

(73) Assignee: KURARAY CO., LTD., Kurashiki-shi (JP)

( * ) Notice: Subject to any disclaimer, the term of this patent is extended or adjusted under 35 U.S.C. 154(b) by 17 days.

This patent is subject to a terminal disclaimer.

(21) Appl. No.: 14/371,508

(22) PCT Filed: Dec. 25, 2012

(86) PCT No.: PCT/JP2012/008236
§ 371 (c)(1),
(2) Date: Jul. 10, 2014

(87) PCT Pub. No.: WO2013/105188
PCT Pub. Date: Jul. 18, 2013

(65) Prior Publication Data
US 2014/0350169 A1 Nov. 27, 2014

(30) Foreign Application Priority Data

Jan. 12, 2012 (JP) ................. 2012-004475
Jan. 12, 2012 (JP) ................. 2012-004476
Jul. 23, 2012 (JP) ................. 2012-163122
Jul. 23, 2012 (JP) ................. 2012-163123

(51) Int. Cl.
| | | |
|---|---|---|
| C08F 28/02 | (2006.01) | |
| C08F 8/00 | (2006.01) | |
| C08F 216/06 | (2006.01) | |
| C08F 28/06 | (2006.01) | |
| C08F 8/12 | (2006.01) | |
| C08L 41/00 | (2006.01) | |
| C09D 141/00 | (2006.01) | |
| D21H 19/20 | (2006.01) | |
| D21H 17/36 | (2006.01) | |
| D21H 21/16 | (2006.01) | |

(52) U.S. Cl.
CPC .............. *C08F 28/02* (2013.01); *C08F 8/00* (2013.01); *C08F 8/12* (2013.01); *C08F 28/06* (2013.01); *C08F 216/06* (2013.01); *C08L 41/00* (2013.01); *C09D 141/00* (2013.01); *D21H 17/36* (2013.01); *D21H 19/20* (2013.01); *D21H 21/16* (2013.01); *C08F 2810/20* (2013.01)

(58) Field of Classification Search
CPC ........ C08F 216/06; C08F 8/12; C08F 218/08; C08F 8/00; C08F 228/02; C08F 28/02; C08F 28/06; C08L 41/00; C08L 77/00; C09D 141/00; D21H 17/36; D21H 21/16; D21H 19/20
USPC ....................................... 524/847
See application file for complete search history.

(56) References Cited

U.S. PATENT DOCUMENTS

| | | | |
|---|---|---|---|
| 4,565,854 A | 1/1986 | Sato et al. | |
| 5,710,211 A | 1/1998 | Sato et al. | |
| 5,847,061 A | 12/1998 | Maekawa et al. | |
| 8,097,345 B2 * | 1/2012 | Hakamata | B32B 27/08 427/372.2 |
| 8,664,333 B2 | 3/2014 | Shibutani et al. | |

FOREIGN PATENT DOCUMENTS

| | | |
|---|---|---|
| CN | 101278007 A | 10/2008 |
| CN | 101679755 | 3/2010 |
| JP | 59-187005 | 10/1984 |
| JP | 06-016738 | 1/1994 |
| JP | 9-100319 | 4/1997 |
| JP | 9-100320 | 4/1997 |
| JP | 09-164763 | 6/1997 |

(Continued)

OTHER PUBLICATIONS

International Search Report Issued Mar. 5, 2013 in PCT/JP12/008236 filed Dec. 25, 2012.

*Primary Examiner* — Kelechi Egwim
(74) *Attorney, Agent, or Firm* — Oblon, McClelland, Maier & Neustadt, L.L.P.

(57) ABSTRACT

The present invention provides a vinyl alcohol polymer having a mercapto group and having excellent reactivity. The present invention is a side-chain mercapto group-containing vinyl alcohol polymer including vinyl alcohol units and structural units represented by the following formula (I) (the characters in the formula are as defined in the description):

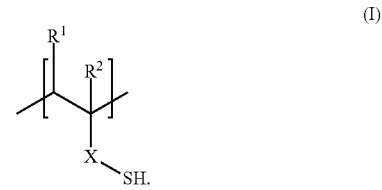

(I)

16 Claims, No Drawings

(56) References Cited

FOREIGN PATENT DOCUMENTS

| | | |
|---|---|---|
| JP | 10-158325 | 6/1998 |
| JP | 2002-012477 | 1/2002 |
| JP | 3256544 | 2/2002 |
| JP | 2003-147144 | 5/2003 |
| JP | 2007-84802 | 4/2007 |
| JP | 2007-224192 | 9/2007 |
| JP | 2007-246639 | 9/2007 |
| JP | 2009-155563 | 7/2009 |

* cited by examiner

VINYL ALCOHOL POLYMER, METHOD FOR PRODUCING SAME, AND COMPOSITION AND COATING AGENT CONTAINING VINYL ALCOHOL POLYMER

CROSS REFERENCE TO RELATED APPLICATION

This application is a 371 of PCT/JP2012/008236, filed on Dec. 25, 2012, and claims priority to the following Japanese Patent Applications: i) 2012-004475, filed on Jan. 12, 2012; ii) 2012-004476, filed on Jan. 12, 2012: iii) 2012-163122, filed on Jul. 23, 2012: and iv) 2012-163123. filed on Jul. 23, 2012.

TECHNICAL FIELD

The present invention relates to a vinyl alcohol polymer having a mercapto group in its side chain and a method for producing the vinyl alcohol polymer. The present invention also relates to a composition containing a vinyl alcohol polymer having a mercapto group in its side chain. The present invention further relates to a coating agent containing a vinyl alcohol polymer having a mercapto group in its side chain.

BACKGROUND ART

Vinyl alcohol polymers (vinyl alcohol polymer may be hereinafter abbreviated as PVA) are one of the few crystalline water-soluble polymers, and have excellent interface properties and strength properties. For this reason, vinyl alcohol polymers are used in paper processing, fiber processing, and emulsion stabilizers, and also occupy an important place as PVA films, PVA fibers, etc. In addition, functional improvement in which specific performances are enhanced by control of the crystallinity or introduction of a functional group has been pursued, and various types of so-called modified PVAs have been developed.

Mercapto groups are highly reactive functional groups, and introduction of mercapto groups into PVAs is beneficial because the introduction allows, for example, production of functional polymers such as graft polymers and block polymers, modification of polymers by various polymer reactions, and impartation of water resistance by reaction with a crosslinking agent.

Some modified PVAs having mercapto groups have been hitherto proposed (Patent Literature 1 to 3). However, the mercapto groups in the modified PVAs are introduced only at the molecular chain terminals, which poses a problem in that the number of reaction points is small and sufficient water resistance is not exhibited by reaction with a crosslinking agent.

Carboxyl-modified PVAs and acetoacetic ester group-containing PVAs are known as PVAs whose reactivity with crosslinking agents has been made use of, and are used, for example, in coating agents for forming printing paper or coat layers (Patent Literature 4 and 5). However, carboxyl group-modified PVAs do not have sufficient reactivity and, therefore, a curing step including storage at 30 to 40° C. for about 1 day to 1 week is required in order to achieve a desired level of water resistance. Acetoacetic ester group-containing PVAs have excellent reactivity, and thus allow impartation of water resistance. However, there is a problem in that reaction between acetoacetic ester groups introduced in side chains and a crosslinking agent rapidly proceeds, leading to poor viscosity stability and short usable life of the resulting solution.

CITATION LIST

Patent Literature

Patent Literature 1: JP 59-187005 A
Patent Literature 2: JP 3256544 B2
Patent Literature 3: JP 2007-246639 A
Patent Literature 4: JP 9-164763 A
Patent Literature 5: JP 2007-84802 A

SUMMARY OF INVENTION

Technical Problem

The present invention aims to provide a vinyl alcohol polymer having mercapto groups and having excellent reactivity, and a method for producing the vinyl alcohol polymer. The present invention also aims to provide a vinyl alcohol polymer composition that affords a product having excellent water resistance. The present invention further aims to provide a coating agent that can exhibit excellent water resistance, has excellent viscosity stability, and has good storage stability.

Solution to Problem

The present invention that has solved the above problems is a side-chain mercapto group-containing vinyl alcohol polymer including vinyl alcohol units and structural units represented by the following formula (I).

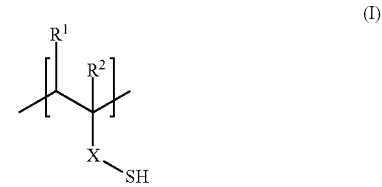

In the formula, $R^1$ is a hydrogen atom or a carboxyl group, $R^2$ is a hydrogen atom, a methyl group, a carboxyl group, or a carboxymethyl group, and X is a bivalent group that contains a carbon atom and a hydrogen atom and that may contain a nitrogen atom and/or an oxygen atom, the bivalent group containing 1 to 22 carbon atoms. When $R^1$ is a carboxyl group, the carboxyl group may form a ring with a hydroxyl group of an adjacent vinyl alcohol unit. When $R^2$ is a carboxyl group or a carboxymethyl group, the carboxyl group or the carboxymethyl group may form a ring with a hydroxyl group of an adjacent vinyl alcohol unit.

The present invention is also a vinyl alcohol polymer composition including the above side-chain mercapto group-containing vinyl alcohol polymer and a water resistance-imparting agent.

The present invention is also a method for producing the above side-chain mercapto group-containing vinyl alcohol polymer, the method including the step of copolymerizing a vinyl ester and an unsaturated monomer convertible to the structural unit represented by the formula (I).

The present invention is also a coating agent including the above side-chain mercapto group-containing vinyl alcohol polymer.

Advantageous Effects of Invention

According to the present invention, a vinyl alcohol polymer having a mercapto group in its side chain and having excellent reactivity, and a method for producing the vinyl alcohol polymer, are provided. In addition, according to the present invention, a vinyl alcohol polymer composition that affords a product having excellent water resistance is provided. Furthermore, according to the present invention, a coating agent that can exhibit excellent water resistance, has excellent viscosity stability, and has good storage stability is provided.

DESCRIPTION OF EMBODIMENTS

A side-chain mercapto group-containing vinyl alcohol polymer of the present invention has structural units shown in the formula (I) given below. Since the number of reaction points can be increased by the presence of mercapto groups in the repeating units of the polymer, the side-chain mercapto group-containing vinyl alcohol polymer of the present invention has high reactivity. In the formula (I), $R^1$ is a hydrogen atom or a carboxyl group, $R^2$ is a hydrogen atom, a methyl group, a carboxyl group, or a carboxymethyl group, and X is a bivalent group that contains a carbon atom and a hydrogen atom and that may contain a nitrogen atom and/or an oxygen atom, the bivalent group containing 1 to 22 carbon atoms. When $R^1$ is a carboxyl group, the carboxyl group may form a ring with a hydroxyl group of an adjacent vinyl alcohol unit. When $R^2$ is a carboxyl group or a carboxymethyl group, the carboxyl group or the carboxymethyl group may form a ring with a hydroxyl group of an adjacent vinyl alcohol unit.

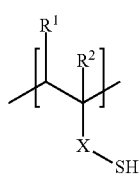

(I)

X in the unit represented by the formula (I) is a site that serves as a spacer between the polymer main chain and the mercapto group and that sterically increases the reactivity of the mercapto group. X is not particularly limited as long as it is a bivalent group that contains a carbon atom and a hydrogen atom and that may contain a nitrogen atom and/or an oxygen atom, the bivalent group containing 1 to 22 carbon atoms. The number of carbon atoms in X is preferably 1 to 20. The numbers of hydrogen atoms, nitrogen atoms, and oxygen atoms contained in X are not particularly limited. Examples of cases where X contains a nitrogen atom and/or an oxygen atom include: cases where X contains a carbonyl bond (—CO—), an ester bond (—COO—), an ether bond (—O—), an amino bond (—NR—, where R is a hydrogen atom or a group containing a carbon atom bonded to N), an amide bond (—CONH—) or the like inserted between carbon atoms of an aliphatic hydrocarbon group; and cases where X contains a carboxyl group (—COOH), a hydroxyl group (—OH) or the like substituted for a hydrogen atom of an aliphatic hydrocarbon group. Examples of X include: a linear, branched, or cyclic aliphatic hydrocarbon group (particularly, an alkylene group) containing 1 to 22 carbon atoms; a linear, branched, or cyclic aliphatic hydrocarbon group (particularly, an alkylene group) that contains at least one bond selected from the group consisting of a carbonyl bond, an ester bond, an ether bond, an amino bond, and an amide bond and that contains 1 to 22 carbon atoms in total; a linear, branched, or cyclic aliphatic hydrocarbon group (particularly, an alkylene group) that has at least one substituent group selected from the group consisting of an alkoxy group, a carboxyl group, and a hydroxyl group and that contains 1 to 22 carbon atoms in total; and a linear, branched, or cyclic aliphatic hydrocarbon group (particularly, an alkylene group) that has at least one substituent group selected from the group consisting of an alkoxy group, a carboxyl group, and a hydroxyl group, that contains at least one bond selected from the group consisting of a carbonyl bond, an ester bond, an ether bond, and an amide bond, and that contains 1 to 20 carbon atoms in total.

In a preferred embodiment, in the formula (I), $R^1$ is a hydrogen atom, $R^2$ is a hydrogen atom or a methyl group, and X is a bivalent group that contains a carbon atom and a hydrogen atom and that may contain a nitrogen atom and/or an oxygen atom, the bivalent group containing 1 to 20 carbon atoms. In this embodiment, in terms of material availability and ease of synthesis, X is preferably a linear or branched alkylene group that may contain a carboxyl group or a hydroxyl group as a substituent and that contains 1 to 20 carbon atoms in total, more preferably a linear or branched alkylene group containing 1 to 20 carbon atoms in total, even more preferably a linear or branched alkylene group containing 2 to 14 carbon atoms in total, and still even more preferably a linear or branched alkylene group containing 2 to 8 carbon atoms in total. From the standpoint of reactivity, X is most preferably a linear alkylene group containing six carbon atoms.

In another preferred embodiment, in the formula (I), X contains an amide bond, and the amide bond is bonded to the main chain of the side-chain mercapto group-containing vinyl alcohol polymer directly or via a single methylene group. In this embodiment, the structural unit represented by the formula (I) is, for example, a structural unit represented by the following formula (I').

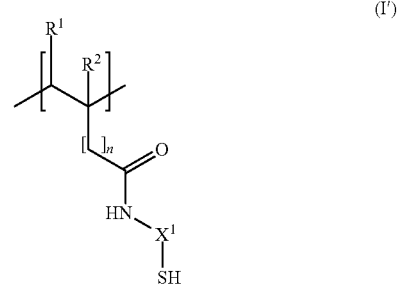

(I')

In the formula, $R^1$ and $R^2$ are the same as defined above, n is 0 or 1, $X^1$ is a bivalent aliphatic hydrocarbon group that contains 1 to 20 carbon atoms and that may contain a nitrogen atom and/or an oxygen atom.

Preferably, n is 0. In this case, X is *—CO—NH—$X^1$—, where * represents a bond with the main chain of the polymer and $X^1$ is the same as defined above. When n is 0, the monomer is less likely to remain unreacted in production of the side-chain mercapto group-containing vinyl alcohol polymer, and the influence of unreacted monomer can be reduced.

The aliphatic hydrocarbon group represented by $X^1$ may be linear, branched, or cyclic, and is preferably linear or branched. When the aliphatic hydrocarbon group is branched, the number of carbon atoms in a site branching from the main chain (chain of atoms aligned between the sulfur atom and the nitrogen atom) of the aliphatic hydrocarbon group is preferably 1 to 5. Examples of cases where $X^1$ contains a nitrogen atom and/or an oxygen atom include: cases where $X^1$ contains a nitrogen atom and/or an oxygen atom as a constituent of a carbonyl bond, an ether bond, an amino bond, an amide bond or the like inserted in the aliphatic hydrocarbon group; and cases where $X^1$ contains a nitrogen atom and/or an oxygen atom as a constituent of a carboxyl group, a hydroxyl group or the like that is a substituent in the aliphatic hydrocarbon group. In terms of material availability and ease of synthesis, $X^1$ is preferably a linear or branched alkylene group that contains 1 to 20 carbon atoms in total and that may have a carboxyl group, more preferably a linear or branched alkylene group that contains 2 to 15 carbon atoms in total and that may have a carboxyl group, and even more preferably a linear or branched alkylene group that contains 2 to 10 carbon atoms in total and that may have a carboxyl group.

Such a structural unit can be copolymerized with a vinyl ester described later, can be derived from an unsaturated monomer convertible to the structural unit represented by the formula (I), and is preferably derived from a thioester monomer having unsaturated double bonds and represented by the formula (II).

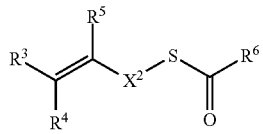

(II)

In the formula, both $R^3$ and $R^4$ are a hydrogen atom, or one of them is a hydrogen atom and the other is a carboxyl group. $R^5$ is a hydrogen atom, a methyl group, a carboxyl group, or a carboxymethyl group. $X^2$ is a group that contains a carbon atom and a hydrogen atom and that may contain a nitrogen atom and/or an oxygen atom, the group containing 1 to 22 carbon atoms. $R^6$ is a methyl group or forms a cyclic structure by covalently binding to a specific carbon atom contained in $X^2$.

When $X^2$ contains an amide bond whose carbonyl carbon is bonded to a vinyl carbon, the thioester monomer having unsaturated double bonds and represented by the formula (II) has good copolymerizability with the vinyl ester described later, and it is easy to increase the amount of modification and the degree of polymerization of the side-chain mercapto group-containing vinyl alcohol polymer of the present invention. In general, the use of a thioester monomer causes concern about odor resulting from the monomer remaining unreacted after the end of polymerization. However, when $X^2$ in the thioester monomer having unsaturated double bonds and represented by the formula (II) contains an amide bond whose carbonyl carbon is bonded to a vinyl carbon, the amount of the monomer that remains unreacted after the end of polymerization is very small. Therefore, the odor of the side-chain mercapto group-containing vinyl alcohol polymer of the present invention can be considerably reduced.

The thioester monomer having unsaturated double bonds and represented by the formula (II) can be produced in accordance with a commonly-known method.

Examples of the thioester monomer having unsaturated double bonds and represented by the formula (II) include: thioacetic acid S-(3-methyl-3-buten-1-yl) ester, thioacetic acid S-17-octadecen-1-yl ester, thioacetic acid S-15-hexadecen-1-yl ester, thioacetic acid S-14-pentadecen-1-yl ester, thioacetic acid S-13-tetradecen-1-yl ester, thioacetic acid S-12-tridecen-1-yl ester, thioacetic acid S-11-dodecen-1-yl ester, thioacetic acid S-10-undecen-1-yl ester, thioacetic acid S-9-decen-1-yl ester, thioacetic acid S-8-nonen-1-yl ester, thioacetic acid S-7-octen-1-yl ester, thioacetic acid S-6-hepten-1-yl ester, thioacetic acid S-5-hexen-1-yl ester, thioacetic acid S-4-penten-1-yl ester, thioacetic acid S-3-buten-1-yl ester, thioacetic acid S-2-propen-1-yl ester, thioacetic acid S-[1-(2-propen-1-yl)hexyl]ester, thioacetic acid S-(2,3-dimethyl-3-buten-1-yl) ester, thioacetic acid S-(1-ethenyl-butyl) ester, thioacetic acid S-(2-hydroxy-5-hexen-1-yl) ester, thioacetic acid S-(2-hydroxy-3-buten-1-yl) ester, thioacetic acid S-(1,1-dimethyl-2-propen-1-yl) ester, 2-[(acetylthio)methyl]-4-pentenoic acid, thioacetic acid S-(2-methyl-2-propen-1-yl) ester, and compounds represented by the following formulae (a-1) to (a-30).

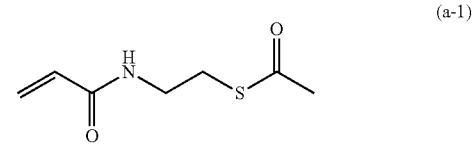

(a-1)

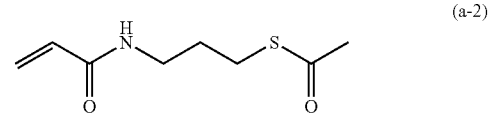

(a-2)

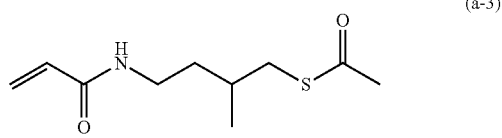

(a-3)

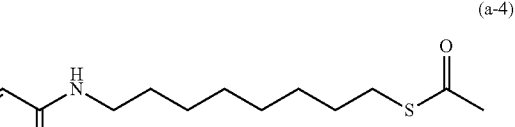

(a-4)

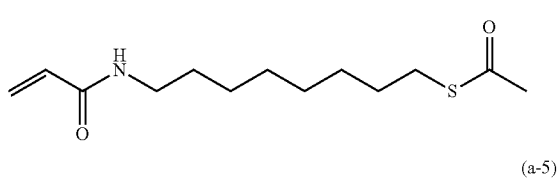

(a-5)

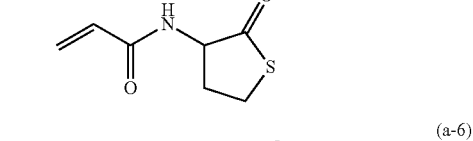

(a-6)

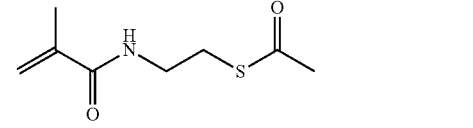

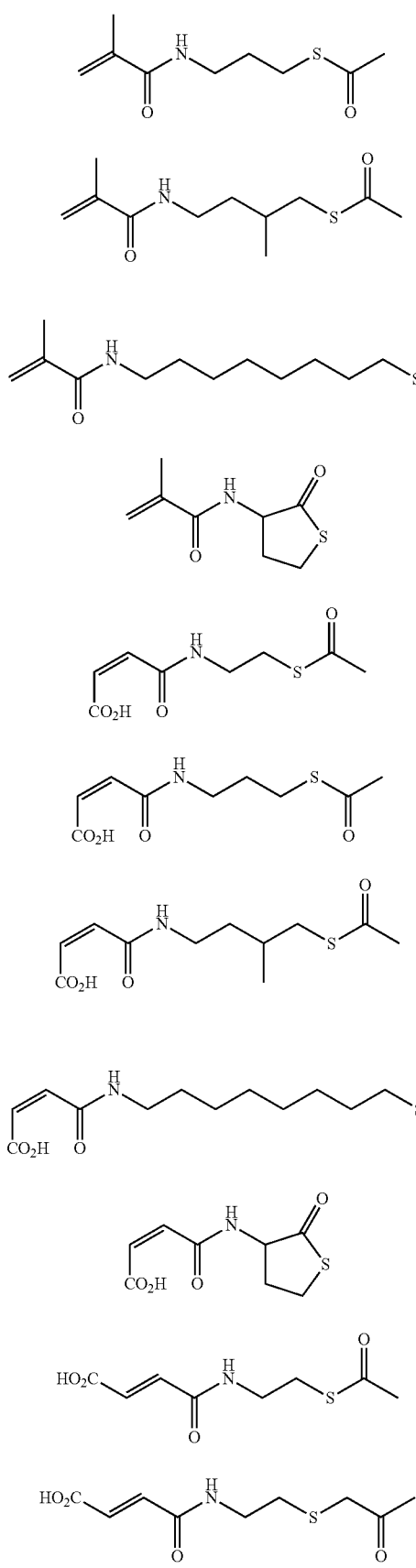
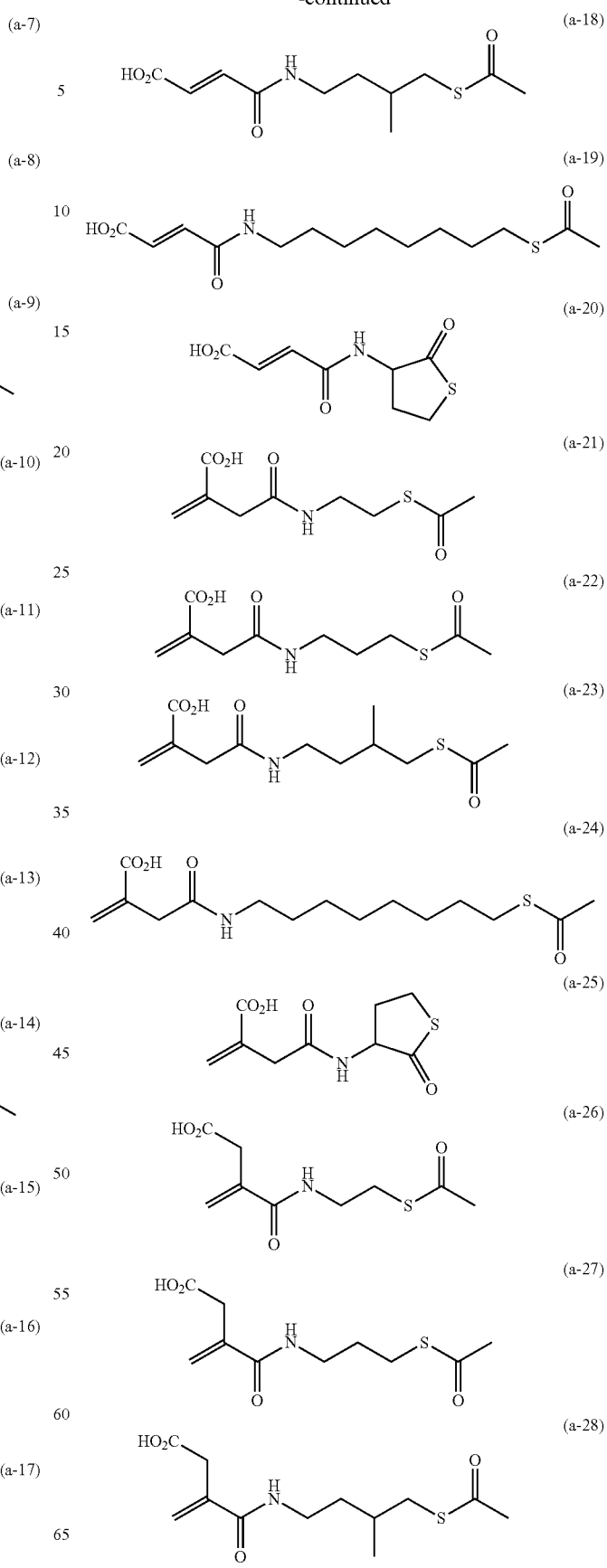

-continued

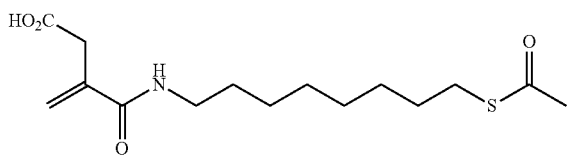

(a-29)

(a-30)

From the standpoint of the polymerizability of the unsaturated monomer, the compounds represented by the formulae (a-1) to (a-30) are preferable, and the compounds represented by the formulae (a-1) to (a-20) and (a-26) to (a-30) are more preferable.

The content of the structural units represented by the formula (I) in the side-chain mercapto group-containing vinyl alcohol polymer of the present invention is not particularly limited. The content is preferably 0.05 to 10 mol %, more preferably 0.1 to 7 mol %, and particularly preferably 0.3 to 6 mol %, with respect to 100 mol % of all of the structural units in the polymer. When the content is within these preferred ranges, the crosslinked coating is more likely to exhibit water resistance. When the content is less than 0.05 mol %, the effect of modification of the vinyl alcohol polymer by the structural units represented by the formula (I) may be insufficient. When the content is more than 10 mol %, the crystallinity of the vinyl alcohol polymer tends to decrease, and the degree of increase in the water resistance of the crosslinked coating may be reduced. The side-chain mercapto group-containing vinyl alcohol polymer of the present invention may have one or two or more types of structural units represented by the formula (I). When the polymer has two or more types of the structural units, it is preferable that the total content of the two or more types of the structural units be within the above-specified range. In the present invention, the structural units in the polymer mean repeating units constituting the polymer. For example, vinyl alcohol units described below and vinyl ester units described below are also structural units.

The content of the vinyl alcohol units in the side-chain mercapto group-containing vinyl alcohol polymer of the present invention (that is, the degree of saponification of the side-chain mercapto group-containing vinyl alcohol polymer of the present invention) is not particularly limited. From the standpoint of solubility in water, the lower limit of the content is preferably at least 50 mol %, more preferably at least 70 mol %, even more preferably at least 75 mol %, and particularly preferably at least 80 mol %, with respect to 100 mol % of all of the structural units in the polymer. The upper limit of the content is preferably at most 99.94 mol %, more preferably at most 99.9 mol %, and even more preferably at most 99.5 mol %, with respect to 100 mol % of all of the structural units in the polymer. In general, it is difficult to produce a vinyl alcohol polymer in which the content is more than 99.94 mol %.

The vinyl alcohol units can be derived from vinyl ester units by hydrolysis, alcoholysis, or the like. Depending on, for example, the conditions for conversion from the vinyl ester units to the vinyl alcohol units, the vinyl ester units remain in the vinyl alcohol polymer in some cases. Therefore, the side-chain mercapto group-containing vinyl alcohol polymer of the present invention may contain vinyl ester units.

Examples of vinyl esters as the vinyl ester units include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, and vinyl benzoate. Among these, vinyl acetate is preferable from the industrial standpoint.

The side-chain mercapto group-containing vinyl alcohol polymer of the present invention can further have other structural units than the structural units represented by the formula (I), the vinyl alcohol units, and the vinyl ester units, as long as the effect of the present invention is obtained. Examples of the other structural units are: a structural unit derived from an unsaturated monomer copolymerizable with a vinyl ester and convertible to the structural unit represented by the formula (I); and a structural unit derived from an ethylenically unsaturated monomer copolymerizable with a vinyl ester. Examples of the ethylenically unsaturated monomer are: α-olefins such as ethylene, propylene, n-butene, isobutylene, and 1-hexene; acrylic acid and salts thereof; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid and salts thereof; methacrylic acid esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide, N-methylacrylamide, N-ethylacrylamide, N,N-dimethylacrylamide, diacetoneacrylamide, acrylamidopropanesulfonic acid and salts thereof, acrylamidopropyl dimethylamine and salts (e.g., quaternary salts) thereof; methacrylamide, N-methylmethacrylamide, N-ethylmethacrylamide, methacrylamidopropanesulfonic acid and salts thereof, methacrylamidopropyl dimethylamine and salts (e.g., quaternary salts) thereof; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, and 2,3-diacetoxy-1-vinyloxypropane; vinyl cyanides such as acrylonitrile and methacrylonitrile; vinyl halides such as vinyl chloride and vinyl fluoride; vinylidene halides such as vinylidene chloride and vinylidene fluoride; allyl compounds such as ally acetate, 2,3-diacetoxy-1-allyloxypropane, and allyl chloride; unsaturated dicarboxylic acids such as maleic acid, itaconic acid, and fumaric acid, and salts and esters thereof; vinylsilyl compounds such as vinyltrimethoxysilane; and isopropenyl acetate.

In the side-chain mercapto group-containing vinyl alcohol polymer of the present invention, the sequence of the structural units represented by the formula (I), the vinyl alcohol units, and the other optional structural units is not particularly limited, and may be of the random copolymer type, the block copolymer type, the alternating polymer type, or the like.

The viscosity-average degree of polymerization of the side-chain mercapto group-containing vinyl alcohol polymer of the present invention as measured in accordance with JIS K 6726 is not particularly limited, and is preferably 100 to 5,000, and more preferably 200 to 4,000. When the viscosity-average degree of polymerization is less than 100, the mechanical strength of a film made of the polymer may be reduced. The side-chain mercapto group-containing vinyl alcohol polymer of the present invention having a viscosity-average degree of polymerization of more than 5,000 is difficult to industrially produce.

The method for producing the side-chain mercapto group-containing vinyl alcohol polymer of the present invention is not particularly limited. A simple production method is a method including the step of copolymerizing a vinyl ester and an unsaturated monomer convertible to the structural unit represented by the formula (I). More specific examples of such a method include a method in which a vinyl ester and an unsaturated monomer convertible to the structural unit represented by the formula (I) are copolymerized, and vinyl ester units of the copolymer obtained are converted to vinyl alcohol units, while units derived from the unsaturated monomer convertible to the structural unit represented by the formula (I) are converted to the structural units represented by the formula (I). In particular, a simple method preferably used is a method in which a vinyl ester and a thioester monomer (referred to as a thioester monomer (II) hereinafter) having unsaturated double bonds and represented by the formula (II) are copolymerized, and ester bonds of vinyl ester units of the copolymer obtained and thioester bonds of structural units derived from the thioester monomer (II) are subjected to hydrolysis or alcoholysis. This method will be described hereinafter.

Copolymerization of the vinyl ester and the thioester monomer (II) can be performed by employing a commonly-known method and conditions for homopolymerization of a vinyl ester.

Another monomer copolymerizable with the vinyl ester and the thioester monomer (II) may be allowed to participate in the copolymerization. Examples of the other copolymerizable monomer are the same as mentioned above for the ethylenically unsaturated monomer.

The ester bonds of the vinyl ester units of the obtained copolymer and the thioester bonds of the structural units derived from the thioester monomer (II) can be subjected to hydrolysis or alcoholysis under approximately the same conditions. Therefore, the hydrolysis or alcoholysis of the ester bonds of the vinyl ester units of the obtained copolymer and the thioester bonds of the structural units derived from the thioester monomer (II) can be performed by employing a commonly-known method and conditions for saponification of homopolymer of a vinyl ester.

With the utilization of its characteristics, the side-chain mercapto group-containing vinyl alcohol polymer of the present invention can be used in various applications requiring use of vinyl alcohol polymers, alone or in the form of a composition having other components added thereto, by processing the polymer in accordance with a commonly-known method such as molding, spinning, or emulsification. For example, the polymer can be used in the following: surfactants for various uses; coating agents for paper; paper modifiers such as internal sizing agents and pigment binders for paper; adhesive agents for wood, paper, aluminum foils, inorganic materials, etc.; non-woven fabric binders; paints; warp sizing agents; fiber processing agents; sizing agents for hydrophobic fibers such as polyester; and various films, sheets, bottles, fibers, thickeners, flocculants, soil modifiers, ion-exchange resins, and ion-exchange membranes.

The method for molding the side-chain mercapto group-containing vinyl alcohol polymer of the present invention is not limited. Examples of the molding method are: a method in which a solution prepared by dissolving the polymer in a solvent such as water or dimethyl sulfoxide is subjected to molding (e.g., cast molding); and a method in which the polymer is plasticized by heating and subjected to molding (e.g., extrusion molding, injection molding, inflation molding, press molding, and blow molding). With these molding methods, a molded article having any shape, such as a film, a sheet, a tube, or a bottle, is obtained.

The side-chain mercapto group-containing vinyl alcohol polymer of the present invention has a larger content of mercapto groups and thereby a larger number of reaction points than mercapto-terminally modified vinyl alcohol polymers, and are therefore rich in reactivity, especially in reactivity with a water resistance-imparting agent such as a crosslinking agent. Accordingly, a vinyl alcohol polymer composition that affords a product having excellent water resistance can be obtained by mixing a water resistance-imparting agent with the side-chain mercapto group-containing vinyl alcohol polymer of the present invention.

The present invention is therefore also a vinyl alcohol polymer composition including the above side-chain mercapto group-containing vinyl alcohol polymer and a water resistance-imparting agent.

Examples of the water resistance-imparting agent contained in the vinyl alcohol polymer composition of the present invention include: zirconyl nitrate, ammonium zirconium carbonate, zirconyl chloride, zirconyl acetate, zirconyl sulfate, aluminum sulfate, aluminum nitrate, titanium lactate, titanium diisopropoxybis(triethanolaminate), acid anhydrides such as pyromellitic dianhydride, divinyl sulfone compounds, melamine resins, methylol melamine, methylolated bisphenol S, polyfunctional vinyl compounds, polyfunctional (meth)acrylate compounds, polyfunctional epoxy compounds, aldehyde compounds, polyfunctional isocyanate compounds, water-soluble oxidants, and polyamide polyamine epichlorohydrin resins.

Examples of the polyfunctional (meth)acrylate compounds mentioned above include, but not limited to, 1-(Acryloyloxy)-3-(methacryloyloxy)-2-propanol;
polyethylene glycol 200 diacrylate;
polyethylene glycol 400 diacrylate;
polypropylene glycol 600 diacrylate;
polyethylene glycol 1000 diacrylate:
propoxylated ethoxylated bis-A diacrylate (PO12/EO6);
2.2-bis[4-(acryloxy polyethoxy]phenyl]propane (EO3 mol);
2.2-bis[4-(acryloxypolyethoxy]phenyl]propane (EO10 mol);
2.2-bis[4-(acryloxy polyethoxy]phenyl]propane (EO20 mol);
2.2-bis[4-(acryloxy polyethoxy]phenyl]propane (EO30 mol);
2.2-bis[4-(acryloxy diethoxy]phenyl]propane (EO4 mol);
9,9-bis[4-(2-acryloyloxy ethoxy)phenyl]fluorene;
2.2-bis[4-(acryloxy polypropoxy]phenyl]propane (PO3 mol);
tricylodecane dimethanol diacrylate;
1,10-decanediol diacrylate;
1,6-hexanediol diacrylate;
1,9-nonanediol diacrylate;
dipropylene glycol diacrylate;
tripropylene glycol diacrylate;
polypropylene glycol 400 diacrylate;
polypropylene glycol #700 diacrylate;
$H_2C=HCOCO-(CH_2CH_2CH_2CH_2O)_9-COCH=CH_2$;
tris(2-acryloxyethyl) isocyanulate;
ε-caprolactone ethoxylated isocyanuric acid triacrylate and ethoxylated isocyanuric acid triacrylate;
ethoxylated glycerine triacrylate (EO9 mol);
ethoxylated glycerine triacrylate (EO20 mol);

pentaerythritol triacrylate (37%);
pentaerythritol triacrylate (55%);
pentaerythritol triacrylate (57%);
trimethylol propane triacrylate;
ditrimethylol propane tetraacrylate;
ethoxylated pentaerythritol tetraacrylate (EO35 mol);
tetramethylol methane tetaacrylate;
di-pentaerythritol polyacrylate; and
an ethylene glycol dimethacrylate represented by $CH_2=C(CH_3)-COO-(CH_2CH_2O)_n-OOC-C(CH_3)=CH_2$ where n is 1, 2, 3, or 4.

Examples of the polyfunctional epoxy compounds mentioned above include, but not limited to: glycidyl ether-type epoxy compounds such as "Denacol" manufactured by Nagase ChemteX Corporation (EX-611, EX-612, EX-614, EX-614B, EX-622, EX-512, EX-521, EX-411, EX-421, EX-313, EX-314, EX-321, EX-201, EX-211, EX-212, EX-252, EX-810, EX-811, EX-850, EX-851, EX-821, EX-830, EX-832, EX-841, EX-861, EX-911, EX-941, EX-920, EX-931, EX-721, EX-203, EX-711, EX-221, etc.), bisphenol A diglycidyl ether, bisphenol A di-β-methylglycidyl ether, bisphenol F diglycidyl ether, tetrahydroxyphenylmethane tetraglycidyl ether, resorcinol diglycidyl ether, brominated bisphenol A diglycidyl ether, chlorinated bisphenol A diglycidyl ether, hydrogenated bisphenol A diglycidyl ether, diglycidyl ether of bisphenol A alkylene oxide adduct, novolac glycidyl ether, polyalkylene glycol diglycidyl ether, glycerin triglycidyl ether, pentaerythritol diglycidyl ether, and epoxy urethane resins; glycidyl ether-ester type epoxy compounds such as p-oxybenzoic acid glycidyl ether-ester; glycidyl ester-type epoxy compounds such as phthalic acid diglycidyl ester, tetrahydrophthalic acid diglycidyl ester, hexahydrophthalic acid diglycidyl ester, acrylic acid diglycidyl ester, and dimer acid diglycidyl ester; glycidyl amine-type epoxy compounds such as glycidyl aniline, tetraglycidyl diaminodiphenylmethane, triglycidyl isocyanurate, and triglycidyl aminophenol; linear aliphatic epoxy resins such as epoxidized polybutadiene and epoxidized soybean oil; and alicyclic epoxy resins such as 3,4-epoxy-6-methylcyclohexylmethyl-3,4-epoxy-6-methylcyclohexanecarboxylate, 3,4-epoxycyclohexylmethyl 3,4-epoxycyclohexanecarboxylate, bis(3,4-epoxy-6-methylcyclohexylmethyl)adipate, vinylcyclohexene diepoxide, dicyclopentadiene oxide, bis(2,3-epoxycyclopentyl)ether, and limonene dioxide.

Examples of the aldehyde compounds mentioned above include, but not limited to: monoaldehydes such as formaldehyde, acetaldehyde, propionaldehyde, crotonaldehyde, and benzaldehyde; and dialdehydes such as glyoxal, malonaldehyde, glutaraldehyde, pimelic dialdehyde, suberic dialdehyde, and dialdehyde starch.

Examples of the polyfunctional isocyanate compounds mentioned above include, but not limited to: "DURANATE" manufactured by Asahi Kasei Chemicals Corporation (WB40-100, WB40-80D, WE50-100, WT30-100, WT20-100, etc.); tolylenediisocyanate (TDI); hydrogenated TDI; trimethylolpropane-TDI adduct (e.g., "Desmodur L" manufactured by Bayer MaterialScience AG); triphenylmethane triisocyanate; methylene(bisphenyl isocyanate) (MDI); hydrogenated MDI; polymeric MDI; hexamethylene diisocyanate; xylylene diisocyanate; 4,4'-dicyclohexylmethane diisocyanate; and isophorone diisocyanate. An isocyanate dispersed in water by use of an emulsifier can also be used.

Examples of the water-soluble oxidants mentioned above include, but not limited to: persulfuric acid salts such as ammonium persulfate, potassium persulfate, and sodium persulfate; hydrogen peroxide; benzoyl peroxide; dicumyl peroxide; cumene hydroperoxide; t-butyl hydroperoxide; potassium bromate; t-butyl peroxyacetate; and t-butyl peroxybenzoate.

A single water resistance-imparting agent may be used alone, or two or more water resistance-imparting agents may be used in combination. The content of the water resistance-imparting agent is not particularly limited, and can be determined depending on the type of the side-chain mercapto group-containing vinyl alcohol polymer. For example, from the standpoint of the water resistance of the coating resulting from reaction with the water resistance-imparting agent, the content of the water resistance-imparting agent is preferably 0.1 parts by weight to 200 parts by weight, more preferably 0.5 parts by weight to 100 parts by weight, and particularly preferably 1 part by weight to 80 parts by weight, with respect to 100 parts by weight of the side-chain mercapto group-containing vinyl alcohol polymer.

The vinyl alcohol polymer composition of the present invention can further be mixed, as necessary, with additives such as a filler, a processing stabilizer such as a copper compound, a weathering stabilizer, a colorant, an ultraviolet absorbent, a light stabilizer, an antioxidant, an antistatic agent, a flame retardant, a plasticizer, another thermoplastic resin, a lubricant, a flavor, an anti-foaming agent, a deodorant, an extender, a release agent, a mold release agent, a reinforcing agent, a fungicide, an antiseptic agent, and crystallization retarder.

The vinyl alcohol polymer composition of the present invention can be used in the same applications and in the same manner as compositions including a commonly-known vinyl alcohol polymer and a water resistance-imparting agent. For example, the vinyl alcohol polymer composition can be effectively used as a coat material for inorganic materials, paper, or organic materials such as various resin base materials, and particularly as a surface coat material for paper and a surface coat material for various resin films. Examples of the resin films include films of polyester, polystyrene, polyamide, polyvinyl chloride, polymethylmethacrylate, cellulose acetate, polycarbonate, and polyimide. In addition, the vinyl alcohol polymer composition of the present invention can be very effectively used in a coat layer, particularly an overcoat layer, of a recording material, especially a thermal recording material incapable of being thermally-treated at high temperatures. The vinyl alcohol polymer composition of the present invention can be used also in the following: an adhesive agent or a binder for inorganic substances or organic substances; a vehicle for paints; a dispersant for dispersing pigments or the like; a polymerization stabilizer or a post-polymerization additive for crosslinkable emulsions; an imaging material such as a gelatin blend or a photosensitive resin; and a base material for hydrogels such as bacteria-immobilized gels and enzyme-immobilized gels. Furthermore, the vinyl alcohol polymer composition can be widely used in applications for which water-soluble resins are conventionally used. Furthermore, the vinyl alcohol polymer composition can be used in molded articles such as films, sheets, and fibers.

When the side-chain mercapto group-containing vinyl alcohol polymer of the present invention is used in a coating agent, the coating agent can exhibit excellent water resistance, has excellent viscosity stability, and has good storage stability. The present invention is therefore also a coating agent including the above side-chain mercapto group-containing vinyl alcohol polymer.

The coating agent of the present invention may include the water resistance-imparting agent described above in addition to the side-chain mercapto group-containing vinyl alcohol polymer. One of the water resistance-imparting agents mentioned above may be used alone, or two or more thereof may be used in combination. From the standpoint of higher viscosity stability of the coating agent, a polyamide polyamine epichlorohydrin resin is preferable.

The weight ratio between the side-chain mercapto group-containing vinyl alcohol polymer and the water resistance-imparting agent is not particularly limited. The amount of the water resistance-imparting agent is preferably 0.5 to 100 parts by weight, and more preferably 1 to 80 parts by weight, with respect to 100 parts by weight of the vinyl alcohol polymer. When the amount of the water resistance-imparting agent is less than 0.5 parts by weight, there is a possibility that the crosslinkability or the crosslinking rate is insufficient. When the amount of the water resistance-imparting agent is more than 100 parts by weight, the water resistance may be reduced or the viscosity stability of the coating agent may be deteriorated.

It is preferable that the coating agent of the present invention contain water and be used in the form of an aqueous coating solution. When the coating agent of the present invention is used in the form of an aqueous coating solution, the solid content concentration can be optionally selected taking into account, for example, the coating performance of the coating agent and the time required for drying after the coating process. The solid content concentration is preferably in the range of 1 to 40 weight % and more preferably in the range of 3 to 30 weight %.

The coating agent of the present invention may contain various additives as necessary. Examples of the additives include: plasticizers such as glycols and glycerin; pH regulators such as ammonia, caustic soda, carbonate of soda, and phosphoric acid; benzophenone-based and benzotriazole-based ultraviolet absorbents; lubricants; thickeners; flow modifiers; dyes; pigments; fluorescent brighteners; antioxidants; antiseptic agents; fungicides; anti-foaming agents; mold release agents; surfactants; and fillers.

To the extent that the effect of the present invention is not impaired, the coating agent of the present invention may contain any of the following materials as an additive: unmodified PVAs; various modified PVAs such as sulfonic acid-modified PVA, acrylamide-modified PVA, cation-modified PVA, and long-chain alkyl-modified PVA; water-soluble polymers such as starch, modified starch, casein, and carboxymethyl cellulose; and synthetic resin emulsions such as styrene-butadiene latex, polyacrylic acid ester emulsion, vinyl acetate-ethylene copolymer emulsion, and vinyl acetate-acrylic acid ester copolymer emulsion.

The coating agent of the present invention is used, for example, in a coat material for inorganic materials, paper, or organic materials such as various resin base materials. In particular, the coating agent is suitable as a coating agent for paper, and can be used as a clear coating agent or a pigment coating agent. When the coating agent of the present invention is used as a clear coating agent, the coating layer can be formed as a coat layer (e.g., an overcoat layer or a back coat layer) on a paper surface. When the coating agent is used as a pigment coating agent, the coating layer can be formed as a color developing layer on a paper surface. The amount of the coating agent of the present invention to be applied is not particularly limited, and is usually about 0.1 to 30 g/m² in terms of solid content.

When the coating agent of the present invention is used as a clear coating agent, the type of paper to be coated is not particularly limited. Examples of the paper include: paperboards such as manila boards, white chipboards, and linerboards; printing paper such as common high-quality paper, medium-quality paper, and photogravure paper; and thermal paper.

When the coating agent of the present invention is used as a clear coating agent, the coating agent may be applied directly to a surface of paper to be coated.

Also when the coating agent of the present invention is used as a pigment coating agent, the type of paper to be coated is not particularly limited. Examples of the paper include thermal paper, ink jet paper, pressure-sensitive paper, coated art paper, and lightweight coated paper.

When the coating agent of the present invention is used as a pigment coating agent, for example, a coating solution obtained by mixing the coating agent and a pigment may be applied to a surface of paper to be coated. The mixing ratio between the coating agent and the pigment is not particularly limited. The coating agent is mixed in an amount of preferably 0.5 to 15 parts by weight, more preferably 1 to 10 parts by weight, with 100 parts by weight of the pigment. The solid content concentration of the coating solution can be adjusted as appropriate within the range of 30 to 65 weight %.

When the coating agent of the present invention is used as a pigment coating agent, the pigment used is not particularly limited, and a commonly-known compound can be used. For example, kaolin, clay, talc, calcium carbonate, baked clay, titanium oxide, diatomite, precipitated silica, gel silica, colloidal silica, aluminum oxide, aluminum hydroxide, synthetic aluminum silicate, synthetic magnesium silicate, polystyrene fine particles, polyvinyl acetate fine particles, urea-formalin resin fine particles, or the like, can be used.

The method for applying the coating agent of the present invention to a paper surface is not particularly limited. For example, a commonly-known coater (a size press coater, an air knife coater, a blade coater, a roll coater, or the like) may be used.

After coating of the paper surface, it is sufficient to perform a drying step. A coating layer excellent in water resistance can be formed in the drying step and, therefore, it is not necessary to separately perform a curing step taking a long time. After the drying step, any step such as a calendering step may be carried out as necessary. The drying step can be carried out either at low temperatures or at high temperatures. Sufficient water resistance can be imparted even when the drying step is performed at a low temperature, for example at 50° C. or lower, particularly at 40° C. or lower, or even at room temperature or lower.

In the manner described above, paper having a coating layer obtained from the coating agent of the present invention can be obtained.

EXAMPLES

Hereinafter, the present invention will be described in detail with reference to Synthesis Examples, Examples, and Comparative Examples. However, the present invention is not limited to these Examples.

[Evaluation of Water Resistance of Film]

Aqueous solutions containing compositions obtained in Examples or Comparative Examples given below were each cast into a 15 cm×15 cm mold fabricated by folding the edges of a polyethylene terephthalate film, and the solvent was sufficiently volatilized at room temperature and atmospheric pressure. Thus, evaluation PVA films having a thickness of about 40 μm were fabricated.

Each of the evaluation films obtained was immersed in a boiling water for 1 hour, then taken out of the water, and vacuum-dried at 40° C. for 12 hours, followed by measuring the weight (W1) of the film. An elution ratio under boiling conditions was calculated from the determined weight (W1) and the weight before immersion (W2) in accordance with the mathematical formula given below. This elution ratio was used as an index of the water resistance after crosslinking. In the case where the evaluation film was dissolved in water during the immersion, the elution ratio was evaluated as "Not measurable".

Elution ratio(weight %)=100×([W2]−[W1])/[W2]

[Evaluation of Viscosity Stability of Coating Solution]

Coating agents obtained in Examples and Comparative Examples described below were left at a temperature of 20° C. for 1 week, after which evaluation was made based on the flowability of the solutions on a two-point scale as shown below.

Good: Flowability was observed.
Poor: Gelation occurred and no flowability of the solution was observed.

[Evaluation of Water Resistance of Coating Layer]

Each of the coating agents obtained in Examples and Comparative Examples described below was applied manually to a surface of commercially-available thermal paper (A4 standard-type thermal paper for word processors, manufactured by KOKUYO Co., Ltd.) using a No. 22 bar coater (manufactured by Eto Kikai), and then was dried using a dryer at 50° C. for 10 minutes to fabricate a coating layer. The paper having the coating layer was immersed in 20° C. water for 16 hours, and then the coated surface was rubbed 100 times with a finger. The degree of peeling that occurred on the surface was examined. When almost no peeling was observed, the water resistance was considered high. The evaluation of the water resistance of the coating layers formed by the coating agents was performed on a three-point scale as shown below. "Good" and "Average" correspond to levels sufficient for practical use.

Good: Almost no peeling was observed even after 100 rubs.
Average: Slight peeling was observed after 50 rubs.
Poor: Peeling occurred at one rub.

Example 1

(1) An amount of 630 parts by weight of vinyl acetate, 13.8 parts by weight of thioacetic acid S-7-octen-1-yl ester represented by the formula (II-1) given below, and 170 parts by weight of methanol, were introduced into a reactor equipped with a stirrer, a reflux cooling tube, an argon feed tube, and a port for adding an initiator. The reaction system was subjected to argon replacement by argon bubbling for 30 minutes. Temperature increase of the reactor was started and, when the internal temperature reached 60° C., 0.5 parts by weight of 2,2'-azobisisobutyronitrile was added to initiate polymerization. The polymerization was allowed to proceed at 60° C. for 4 hours, followed by cooling to terminate the polymerization. The polymerization ratio at the termination of the polymerization was 38%. Subsequently, the unreacted monomer was removed with occasional addition of methanol at 30° C. and reduced pressure. Thus, a methanol solution of a thioester group-containing polyvinyl acetate (concentration: 35.6%) was obtained.

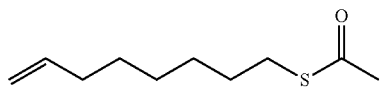

(II-1)

A part of the thioester group-containing polyvinyl acetate obtained was dried and solidified, and was analyzed with $^1$H-NMR (270 MHz, DMSO-$d_6$, 60° C.). The polyvinyl acetate was found to be a thioester group-containing polyvinyl acetate in which the copolymerized thioacetic acid S-7-octen-1-yl ester units accounted for 0.5 mol % in the total number of moles of all structural units. The result of the $^1$H-NMR analysis is shown below.

$^1$H-NMR (270 MHz, DMSO-$d_6$, 60° C.) δ (ppm): 1.1-1.9 (—C$\underline{H}_2$CH(OCOCH$_3$)— and —C$\underline{H}_2$CH(CH$_2$CH$_2$CH$_2$C$\underline{H}_2$CH$_2$CH$_2$SCOCH$_3$)—), 1.9-2.1 (—CH$_2$CH(OCOC$\underline{H}_3$)—), 2.29-2.31 (—CH$_2$CH(CH$_2$CH$_2$CH$_2$CH$_2$CH$_2$CH$_2$SCOC$\underline{H}_3$)—), 2.75-2.86 (—CH$_2$CH(CH$_2$CH$_2$CH$_2$CH$_2$CH$_2$C$\underline{H}_2$SCOCH$_3$)—), 4.6-4.9 (—CH$_2$C$\underline{H}$(OCOCH$_3$)—)

(2) To 280.9 parts by weight of the methanol solution of the thioester group-containing polyvinyl acetate obtained in (1) was added 39.7 parts by weight of methanol (the amount of the thioester group-containing polyvinyl acetate in the resulting solution was 100 parts by weight). To the solution was further added 12.7 parts by weight of a sodium hydroxide methanol solution (concentration: 12.8%) to allow saponification to take place at 40° C. (in the saponification solution, the concentration of the thioester group-containing polyvinyl acetate was 30%, and the molar ratio of sodium hydroxide to the vinyl acetate units of the thioester group-containing polyvinyl acetate was 0.035). A gelled product was produced about 8 minutes after the addition of the sodium hydroxide methanol solution. This product was ground with a grinder, and was left at 40° C. for 52 minutes to allow the saponification to proceed. To the saponified product was added methyl acetate to neutralize the remaining alkali. Thereafter, the resulting product was washed thoroughly with methanol and dried in a vacuum dryer at 40° C. for 12 hours to obtain a copolymer (PVA-1). The obtained copolymer had odor thought to be attributable to the unreacted monomer.

The obtained copolymer was analyzed with $^1$H-NMR (270 MHz, D$_2$O (containing 3-(trimethylsilyl)-1-propanesulfonic acid sodium salt (DSS), 60° C.). The copolymer was found to be a mercapto group-containing polyvinyl alcohol in which the copolymerized 8-mercapto-1-octene units accounted for 0.5 mol % in the total number of moles of all structural units. The degree of saponification of the mercapto group-containing polyvinyl alcohol was 98.4 mol %. In addition, the viscosity-average degree of polymerization of the polyvinyl alcohol measured in accordance with JIS K 6726 was 1600. The result of the $^1$H-NMR analysis is shown below.

$^1$H-NMR (270 MHz, D$_2$O (containing DSS), 60° C.) δ (ppm): 1.3-1.9 (—C$\underline{H}_2$CH(OH)— and —C$\underline{H}_2$CH(CH$_2$CH$_2$CH$_2$CH$_2$CH$_2$SH)—), 2.05-2.15 (—CH$_2$CH(OCOC$\underline{H}_3$)—), 2.51-2.61 (—CH$_2$CH(CH$_2$CH$_2$CH$_2$CH$_2$CH$_2$C$\underline{H}_2$SH)—), 3.9-4.2 (—CH$_2$C$\underline{H}$(OH)—)

Examples 2 to 5

Mercapto group-containing polyvinyl alcohols (PVA-2 to PVA-5) listed in Table 1 were obtained in the same manner as in Example 1, except that the amounts of vinyl acetate, thioacetic acid S-7-octen-1-yl ester, methanol, and 2,2'-azobisisobutyronitrile used, and the molar ratio of sodium hydroxide to the vinyl acetate units at the saponification, were changed to the values shown in Table 1. The obtained mercapto group-containing polyvinyl alcohols had odor thought to be attributable to the unreacted monomer. The results of evaluation (carried out in the same manner as for Example 1) of the obtained mercapto group-containing polyvinyl alcohols are shown in Table 2.

Example 6

A mercapto group-containing polyvinyl alcohol (PVA-6) listed in Table 1 was obtained in the same manner as in Example 1, except that thioacetic acid S-11-dodecen-1-yl ester represented by the formula (II-2) given below was used instead of the thioacetic acid S-7-octen-1-yl ester in an amount shown in Table 1, and that the amounts of vinyl acetate, methanol, and 2,2'-azobisisobutyronitrile used, and the molar ratio of sodium hydroxide to the vinyl acetate units at the saponification, were changed to the values shown in Table 1. The obtained mercapto group-containing polyvinyl alcohol had odor thought to be attributable to the unreacted monomer. The result of $^1$H-NMR analysis (270 MHz, $D_2O$ (containing DSS), 60° C.) of the obtained mercapto group-containing polyvinyl alcohol is shown below. In addition, the results of evaluation (carried out in the same manner as for Example 1) of the obtained mercapto group-containing polyvinyl alcohol are shown in Table 2.

amounts of vinyl acetate, methanol, and 2,2'-azobisisobutyronitrile used, and the molar ratio of sodium hydroxide to the vinyl acetate units at the saponification, were changed to the values shown in Table 1. The obtained mercapto group-containing polyvinyl alcohols had odor thought to be attributable to the unreacted monomer. The result of $^1$H-NMR analysis (270 MHz, $D_2O$ (containing DSS), 60° C.) of PVA-7 is shown below. In addition, the results of evaluation (carried out in the same manner as for Example 1) of the obtained mercapto group-containing polyvinyl alcohols are shown in Table 2.

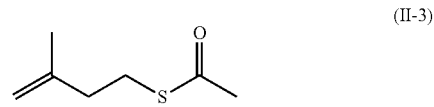

(II-3)

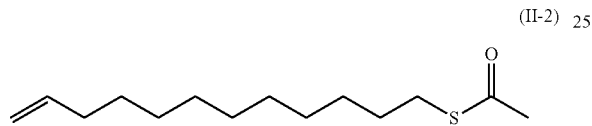

(II-2)

$^1$H-NMR (270 MHz, $D_2O$ (containing DSS), 60° C.) δ (ppm): 0.9-1.1 (—CH$_2$C(C$\underline{H}_3$)(CH$_2$CH$_2$SH)—), 1.3-1.9 (—C$\underline{H}_2$CH(OH)— and —C$\underline{H}_2$C(CH$_3$)(C$\underline{H}_2$CH$_2$SH)—), 2.05-2.15 (—CH$_2$CH(OCOC$\underline{H}_3$)—), 2.51-2.61 (—CH$_2$C(CH$_3$)(CH$_2$C$\underline{H}_2$SH)—), 3.9-4.2 (—CH$_2$C$\underline{H}$(OH)—)

TABLE 1

| | | Initially-introduced materials | | | | | Polymer- | Saponification conditions | |
| | | | | Comonomer | | | | | |
| | Type of PVA | Vinyl acetate (Parts) | Methanol (Parts) | Type | Added amount (Parts) | AIBN (Parts) | ization ratio (%) | PVAc concentration (%) | Molar ratio of NaOH[1] |
| --- | --- | --- | --- | --- | --- | --- | --- | --- | --- |
| Example 1 | PVA-1 | 630 | 170 | TOE | 13.8 | 0.5 | 38 | 30 | 0.035 |
| Example 2 | PVA-2 | 630 | 270 | TOE | 13.8 | 1.0 | 46 | 30 | 0.050 |
| Example 3 | PVA-3 | 630 | 220 | TOE | 8.2 | 0.2 | 41 | 30 | 0.030 |
| Example 4 | PVA-4 | 630 | 270 | TOE | 27.8 | 1.0 | 45 | 30 | 0.050 |
| Example 5 | PVA-5 | 630 | 520 | TOE | 42.1 | 1.5 | 50 | 30 | 0.070 |
| Example 6 | PVA-6 | 630 | 160 | TDDE | 17.9 | 0.5 | 40 | 30 | 0.008 |
| Example 7 | PVA-7 | 630 | 270 | TMBE | 67.3 | 2.0 | 50 | 30 | 0.030 |
| Example 8 | PVA-8 | 630 | 80 | TMBE | 8.5 | 0.5 | 30 | 30 | 0.035 |

[1]Molar ratio of sodium hydroxide (NaOH) to vinyl acetate units of the polymer introduced
TOE: thioacetic acid S-7-octen-1-yl ester
TDDE: thioacetic acid S-11-dodecen-1-yl ester
TMBE: thioacetic acid S-(3-methyl-3-buten-1-yl) ester
AIBN: 2,2'-azobisisobutyronitrile $^1$H-NMR (270 MHz, $D_2O$ (containing DSS), 60° C.) δ (ppm): 1.3-1.9 (—C$\underline{H}_2$CH(OH)— and —C$\underline{H}_2$C$\underline{H}$(C$\underline{H}_2$C$\underline{H}_2$CH$_2$CH$_2$CH$_2$C$\underline{H}_2$CH$_2$CH$_2$CH$_2$SH)—), 2.05-2.15 (—CH$_2$CH(OCOC$\underline{H}_3$)—), 2.51-2.61 (—CH$_2$CH(CH$_2$CH$_2$CH$_2$CH$_2$CH$_2$CH$_2$CH$_2$CH$_2$CH$_2$C$\underline{H}_2$SH)—), 3.9-4.2 (—CH$_2$C$\underline{H}$(OH)—)

Examples 7 and 8

Mercapto group-containing polyvinyl alcohols (PVA-7 and PVA-8) listed in Table 1 were obtained in the same manner as in Example 1, except that thioacetic acid S-(3-methyl-3-buten-1-yl) ester represented by the formula (II-3) given below was used instead of the thioacetic acid S-7-octen-1-yl ester in an amount shown in Table 1, and that the

Examples 9 to 13

In 28.5 parts by weight of water was dissolved 1.5 parts by weight of each of PVA-1 to PVA-5 obtained in Examples 1 to 5. To the solution was added an acrylate crosslinking agent ("NK Ester" A-400 manufactured by Shin-Nakamura Chemical Co., Ltd.) in such a proportion that the number of moles of mercapto groups of the mercapto group-containing PVA and the number of moles of acryloyloxy groups of the acrylate crosslinking agent were equal. Thus, aqueous solutions of vinyl alcohol polymer compositions were fabricated. The water resistance of each vinyl alcohol polymer composition after crosslinking was evaluated according to the evaluation method described above. The results are shown in Table 2.

Examples 14 to 16

The same procedures as in Example 9 were performed, except that PVA-6 to PVA-8 were used instead of PVA-1 used in Example 9, and that another acrylate crosslinking agent ("NK Ester" ATM-35E manufactured by Shin-Nakamura Chemical Co., Ltd.) was used. The results are also shown in Table 2.

Example 17

The same procedures as in Example 9 were performed, except that instead of the acrylate crosslinking agent used in Example 9, an epoxy crosslinking agent ("Denacol" EX-512 manufactured by Nagase ChemteX Corporation) was used in such a proportion that the number of moles of mercapto groups of the mercapto group-containing PVA and the number of moles of epoxy groups of the epoxy crosslinking agent were equal. The results are also shown in Table 2.

Example 18

The same procedures as in Example 9 were performed, except that instead of the acrylate crosslinking agent used in Example 9, an isocyanate crosslinking agent ("DURANATE" WB40-100 manufactured by Asahi Kasei Chemicals Corporation and having an isocyanate group content of 16.6 wt %) was used in such a proportion that the number of moles of mercapto groups of the mercapto group-containing PVA and the number of moles of isocyanate groups of the isocyanate crosslinking agent were equal. The results are also shown in Table 2.

followed by heating under reflux for 4 hours. Cooling to room temperature was performed, after which the solid precipitated was collected by filtration and then washed with methylene chloride to obtain 4.1 parts by weight of S-aminoethyl thioacetate hydrochloride.

Next, 1.9 parts by weight of the obtained S-aminoethyl thioacetate hydrochloride, 3.7 parts by weight of triethylamine, 0.3 parts by weight of hydroquinone, and 30 parts by weight of methylene chloride, were introduced into another reactor, followed by cooling to 0° C. Then, 1.3 parts by weight of methacryloyl chloride was added dropwise over 1 hour, after which stirring was performed with the temperature maintained at 0° C. for 3 hours to complete the reaction. To the resulting product was added a saturated aqueous sodium hydrogen carbonate solution to perform liquid separation. The methylene chloride layer extracted was concentrated to obtain a crude product. The obtained crude product was subjected to isolation and purification by silica gel column chromatography (developing solvent: a mixed solvent of methylene chloride and ethyl acetate (methylene chloride/ethyl acetate=1/5)), so that 1.1 parts by weight of a thioester monomer (a-6) was obtained. The result of $^1$H-NMR analysis is shown below.

$^1$H-NMR (270 MHz, DMSO-d$_6$, TMS) δ (ppm): 1.79 (3H, CH$_2$CC$\underline{H}_3$), 1.92 (3H, SCOC$\underline{H}_3$), 2.96 (2H, SC$\underline{H}_2$CH$_2$NH), 3.21 (2H, SCH$_2$C$\underline{H}_2$NH), 5.78 (1H, C$\underline{H}_2$CCH$_3$), 6.04 (1H, C$\underline{H}_2$CCH$_3$), 8.08 (1H, SCH$_2$CH$_2$N$\underline{H}$)

TABLE 2

| | PVA | | | | Water resistance | |
|---|---|---|---|---|---|---|
| | Type of PVA | Viscosity-average degree of polymerization | Amount of modification (mol %) | Degree of saponification (mol %) | Crosslinking agent | Elution ratio (%) |
| Example 9 | PVA-1 | 1600 | 0.5 | 98.4 | Acrylate | 8.8 |
| Example 10 | PVA-2 | 1300 | 0.5 | 99.1 | Acrylate | 9.3 |
| Example 11 | PVA-3 | 1800 | 0.3 | 98.5 | Acrylate | 43.8 |
| Example 12 | PVA-4 | 1000 | 1.0 | 97.8 | Acrylate | 3.9 |
| Example 13 | PVA-5 | 600 | 1.5 | 98.2 | Acrylate | 4.6 |
| Example 14 | PVA-6 | 1700 | 0.5 | 87.0 | Acrylate | 15.3 |
| Example 15 | PVA-7 | 400 | 3.0 | 85.0 | Acrylate | 15.0 |
| Example 16 | PVA-8 | 2400 | 0.4 | 98.7 | Acrylate | 14.6 |
| Example 17 | PVA-1 | 1600 | 0.5 | 98.4 | Epoxy | 10.6 |
| Example 18 | PVA-1 | 1600 | 0.5 | 98.4 | Isocyanate | 11.0 |

Synthesis Example 1

Synthesis of Thioester Monomer (a-6)

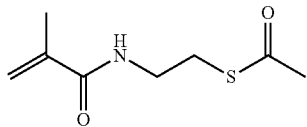
(a-6)

An amount of 3.1 parts by weight of 2-aminoethanethiol hydrochloride and 20 parts by weight of methylene chloride were introduced into a reactor, and 4.3 parts by weight of acetyl chloride was added dropwise at room temperature,

Synthesis Example 2

Synthesis of Thioester Monomer (a-9)

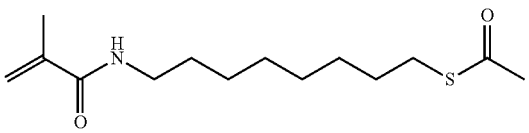
(a-9)

An amount of 14.6 parts by weight of 1-amino-7-octene hydrochloride, 10.2 parts by weight of thioacetic acid, and 100 parts by weight of tetrahydrofuran, were introduced into a reactor, into which argon was supplied for 20 minutes. Thereafter, while the argon atmosphere was maintained, 1.5 parts by weight of 2,2-azobisisobutyronitrile was added, followed by heating under reflux for 2 hours. Cooling to room temperature was performed, and 1.5 parts by weight of hydroquinone was added, after which the solvent was distilled away at reduced pressure. The solid obtained was purified by recrystallization using methyl acetate, and thus 15.4 parts by weight of S-aminooctyl thioacetate hydrochloride was obtained.

Next, 15.4 parts by weight of the obtained S-aminooctyl thioacetate hydrochloride, 19.7 parts by weight of triethylamine, 0.3 parts by weight of hydroquinone, and 100 parts by weight of tetrahydrofuran were introduced into another reactor, followed by heating under reflux for 30 minutes. Thereafter, cooling to 0° C. was performed, and 7.5 parts by weight of methacryloyl chloride was added dropwise over 2 hours. Thereafter, the temperature was increased to room temperature, and stirring was further performed for 30 minutes to complete the reaction. The solvent was distilled away at reduced pressure, after which liquid separation was performed using ethyl acetate and an aqueous sodium hydrogen carbonate solution (concentration: 5 weight %). The ethyl acetate layer extracted was concentrated to obtain a crude product. The obtained crude product was subjected to isolation and purification by silica gel column chromatography, so that a thioester monomer (a-9) was obtained. The result of $^1$H-NMR analysis is shown below.

$^1$H-NMR (270 MHz, DMSO-$d_6$, TMS) δ (ppm): 1.2-1.5 (12H, SCH$_2$C$\underline{H}_2$C$\underline{H}_2$C$\underline{H}_2$C$\underline{H}_2$C$\underline{H}_2$C$\underline{H}_2$C$\underline{H}_2$NH), 1.82 (3H, CH$_2$CC$\underline{H}_3$), 2.30 (3H, SCOC$\underline{H}_3$), 2.81 (2H, SC$\underline{H}_2$CH$_2$), 3.05 (2H, CH$_2$C$\underline{H}_2$NH), 5.27 (1H, C$\underline{H}_2$CCH$_3$), 5.60 (1H, C$\underline{H}_2$CCH$_3$), 7.86 (1H, CH$_2$N$\underline{H}$)

Synthesis Example 3

Synthesis of Thioester Monomer (a-10)

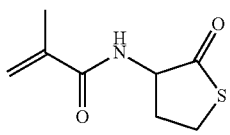

Into a reactor were introduced 2.5 parts by weight of DL-homocysteine thiolactone hydrochloride, 5.0 parts by weight of triethylamine, 0.3 parts by weight of hydroquinone, and 60 parts by weight of methylene chloride, followed by cooling to 0° C. Then, 1.7 parts by weight of methacryloyl chloride was added dropwise over 1 hour. Thereafter, the temperature was increased to room temperature, and stirring was performed for 1 hour to complete the reaction. To the resulting product was added a saturated aqueous sodium hydrogen carbonate solution to perform liquid separation. The methylene chloride layer extracted was concentrated to obtain a crude product. The obtained crude product was dissolved in methylene chloride, and activated carbon was added, followed by stirring at room temperature for 30 minutes. The activated carbon was separated by filtration using Celite and silica gel, and then the filtered solution was concentrated to obtain 2.1 parts by weight of a thioester monomer (a-10). The result of $^1$H-NMR analysis is shown below.

$^1$H-NMR (270 MHz, DMSO-$d_6$, TMS) δ (ppm): 1.85 (3H, CH$_2$CC$\underline{H}_3$), 2.1-2.5 (2H, SCH$_2$C$\underline{H}_2$), 3.3-3.5 (2H, SC$\underline{H}_2$CH$_2$), 4.7 (1H, SCOC$\underline{H}$NH), 5.41 (1H, C$\underline{H}_2$CCH$_3$), 5.70 (1H, C$\underline{H}_2$CCH$_3$), 8.23 (1H, CHN$\underline{H}$)

Synthesis Example 4

Synthesis of Thioester Monomer (a-11)

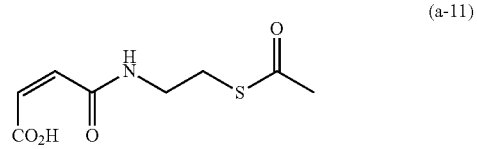

Into a reactor were introduced 1.5 parts by weight of S-aminoethyl thioacetate hydrochloride obtained in the same manner as in Synthesis Example 1, 1.0 parts by weight of maleic anhydride, 0.8 parts by weight of sodium acetate, and 50 parts by weight of acetic acid, followed by stirring at room temperature for 4 hours. To the resulting product was added 100 parts by weight of water. Stirring was performed at room temperature for 5 hours, after which the solid precipitated was collected by filtration to obtain 1.4 parts by weight of a thioester monomer (a-11). The result of $^1$H-NMR analysis is shown below.

$^1$H-NMR (270 MHz, DMSO-$d_6$, TMS) δ (ppm): 2.33 (3H, SCOC$\underline{H}_3$), 3.07 (2H, SC$\underline{H}_2$CH$_2$NH), 3.45 (2H, SCH$_2$C$\underline{H}_2$NH), 4.89 (1H, SCH$_2$CH$_2$N$\underline{H}$), 6.24 (1H, COC$\underline{H}$CHCO), 6.42 (1H, COCHC$\underline{H}$CO)

Example 19

Synthesis of Modified Polyvinyl Alcohol (PVA-9)

An amount of 450 parts by weight of vinyl acetate, 0.37 parts by weight of the thioester monomer (a-9) as a comonomer, and 141 parts by weight of methanol, were introduced into a reactor equipped with a stirrer, a reflux cooling tube, an argon feed tube, a port for adding a comonomer, and a port for adding an initiator. The reaction system was subjected to argon replacement by argon bubbling for 30 minutes. Separately, a methanol solution of the thioester monomer (a-9) (concentration: 4 weight %) was prepared as a solution (hereinafter referred to as a delay solution) for consecutive addition of the comonomer, and was bubbled with argon for 30 minutes. Temperature increase of the reactor was started and, when the internal temperature reached 60° C., 0.1 parts by weight of 2,2'-azobisisobutyronitrile was added to initiate polymerization. While the polymerization reaction was proceeding, the delay solution prepared was added dropwise to the reaction system so that the monomer composition (the molar ratio between the vinyl acetate and the thioester monomer (a-9)) in the polymerization solution was kept constant. The polymerization was allowed to proceed at 60° C. for 210 minutes, followed by cooling to terminate the polymerization. The polymerization ratio at the termination of the polymerization was 40%, and almost none of the thioester monomer (a-9) remained in the polymerization system. Next, the unreacted vinyl acetate monomer was distilled away with addition of methanol at 30° C. and reduced pressure. Thus, a methanol solution (concentration: 21 weight %) of a modified polyvinyl acetate having the thioester monomer (a-9) introduced therein was obtained.

Next, methanol was added to 95 parts by weight of the obtained methanol solution to adjust the amount of the solution to 98 parts by weight. To the solution was added 2.2 parts by weight of a methanol solution of sodium hydroxide (concentration: 12.8 weight %), and saponification was allowed to take place at 40° C. for 1 hour. After the end of the saponification, 200 parts by weight of methyl acetate was added to neutralize the remaining alkali. The completion of the neutralization was confirmed using a phenolphthalein indicator, and then the solution was filtered to obtain a white solid. Next, a washing step including successively addition of 300 parts by weight of methanol to the white solid obtained, stirring at 50° C., and filtration, was repeated three times. The washed white solid was dried by a vacuum dryer at 40° C. for 24 hours, and thus a modified polyvinyl alcohol (PVA-9) was obtained. The obtained modified polyvinyl alcohol had almost no odor. The conditions of the synthesis are shown in Table 3. Chemical shift values obtained by $^1$H-NMR measurement are shown below. The content of the structural units represented by the formula (I) (the amount of modification) and the content of the vinyl alcohol units (the degree of saponification), which were determined by $^1$H-NMR measurement, are shown in Table 4. Furthermore, the viscosity-average degree of polymerization measured in accordance with JIS K 6726 is shown in Table 4.

$^1$H-NMR (270 MHz, D$_2$O (containing 3-(trimethylsilyl)-1-propanesulfonic acid sodium salt (DSS)), 60° C.) δ (ppm): 0.9-1.1 (—CH$_2$CC$\underline{H}$$_3$), 1.3-1.9 (—C$\underline{H}$$_2$CH(OH)—, NHCH$_2$C$\underline{H}$$_2$C$\underline{H}$$_2$C$\underline{H}$$_2$C$\underline{H}$$_2$C$\underline{H}$$_2$C$\underline{H}$$_2$CH$_2$SH), 2.0-2.2 (—CH$_2$CH(OCOC$\underline{H}$$_3$)—), 2.5-2.6 (CH$_2$C$\underline{H}$$_2$SH), 3.5-4.2 (—CH$_2$C$\underline{H}$(OH)—, NHC$\underline{H}$$_2$CH$_2$)

Examples 20 to 25

Various modified polyvinyl alcohols (PVA-10 to PVA-15) were synthesized in the same manner as in Example 19, except that the polymerization conditions (the amounts of the vinyl acetate monomer, methanol, and comonomer initially introduced and the type of the comonomer used in the polymerization) and the saponification conditions (the concentration of the modified polyvinyl acetate and the molar ratio of sodium hydroxide to the vinyl acetate units) were changed as shown in Table 3. The obtained modified polyvinyl alcohols had almost no odor. Chemical shift values obtained by $^1$H-NMR measurement are shown below. The content of the structural units represented by the formula (I) (the amount of modification) and the content of the vinyl alcohol units (the degree of saponification), which were determined by $^1$H-NMR measurement, are shown in Table 4. Furthermore, the viscosity-average degree of polymerization measured in accordance with JIS K 6726 is shown in Table 4.

<PVA-11>
$^1$H-NMR (270 MHz, D$_2$O (containing DSS), 60° C.) δ (ppm): 0.9-1.1 (—CH$_2$CC$\underline{H}$$_3$), 1.3-1.9 (—C$\underline{H}$$_2$CH(OH)—), 2.0-2.2 (—CH$_2$CH(OCOC$\underline{H}$$_3$)—), 2.5-2.6 (NHCH$_2$C$\underline{H}$$_2$SH), 3.5-4.2 (—CH$_2$C$\underline{H}$(OH)—, NHC$\underline{H}$$_2$CH$_2$SH)

<PVA-12>
$^1$H-NMR (270 MHz, D$_2$O (containing DSS), 60° C.) δ (ppm): 0.9-1.1 (—CH$_2$CC$\underline{H}$$_3$), 1.3-1.9 (—C$\underline{H}$$_2$CH(OH)—, —C$\underline{H}$$_2$CCH$_3$, SHCH$_2$C$\underline{H}$$_2$CHNH), 2.0-2.2 (—CH$_2$CH(OCOC$\underline{H}$$_3$)—), 2.5-2.6 (NHCHCH$_2$C$\underline{H}$$_2$SH), 3.8-4.2 (—CH$_2$C$\underline{H}$(OH)—, NHC$\underline{H}$COOH)

<PVA-13>
$^1$H-NMR (270 MHz, D$_2$O (containing DSS), 60° C.) δ (ppm): 1.3-1.9 (—C$\underline{H}$$_2$CH(OH)—), 2.0-2.2 (—CH$_2$CH(OCOC$\underline{H}$$_3$)—), 2.5-2.6 (NHCH$_2$C$\underline{H}$$_2$SH), 3.5-4.2 (—CH$_2$C$\underline{H}$(OH)—, —C$\underline{H}$(COOH)CH—, NHC$\underline{H}$$_2$CH$_2$SH)

Examples 26 to 31

In 28.5 parts by weight of water was dissolved 1.5 parts by weight of each of PVA-9 to PVA-14 obtained in Examples 19 to 24. To the solution was added an acrylate crosslinking agent ("NK Ester" A-400 manufactured by Shin-Nakamura Chemical Co., Ltd.) in such a proportion that the number of moles of mercapto groups of the mercapto group-containing PVA and the number of moles of acryloyloxy groups of the acrylate crosslinking agent were equal. Thus, aqueous solutions of vinyl alcohol polymer compositions were fabricated. The water resistance of each vinyl alcohol polymer composition after crosslinking was evaluated according to the evaluation method described above. The results are shown in Table 4.

Example 32

In 28.5 parts by weight of water was dissolved 1.5 parts by weight of PVA-15 obtained in Example 25. To the solution was added an isocyanate crosslinking agent ("DURANATE" WB-40-100 manufactured by Asahi Kasei Chemicals Corporation and having an isocyanate group content of 16.6 wt %) in such a proportion that the number of moles of mercapto groups of the mercapto group-containing PVA and the number of moles of isocyanate groups of the isocyanate crosslinking agent were equal. Thus, an aqueous solution of a vinyl alcohol polymer composition was fabricated. The water resistance of the vinyl alcohol polymer composition after crosslinking was evaluated according to the evaluation method described above. The result is shown in Table 4.

Comparative Example 1

The same procedures as in Example 26 were performed, except that an unmodified PVA (PVA-16, viscosity-average degree of polymerization: 1700, degree of saponification: 98.5 mol %) was used instead of PVA-9 used in Example 26, and that the added amount of the acrylate crosslinking agent was 0.15 mol % (the same amount in parts by weight as in Example 26) relative to the vinyl alcohol units of the unmodified PVA. The result is also shown in Table 4.

Comparative Example 2

The same procedures as in Example 26 were performed, except that a mercapto-terminally modified PVA (PVA-17) was used instead of PVA-9 used in Example 26. The result is also shown in Table 4.

TABLE 3

| | Initially-introduced materials | | | | Polymer-ization ratio (%) | Saponification conditions | |
|---|---|---|---|---|---|---|---|
| Type of PVA | Vinyl acetate (Parts) | Methanol (Parts) | Comonomer Type | Added amount (Parts) | | PVAc concentration (%) | Molar ratio of NaOH[1] |
| Example 19 PVA-9 | 450 | 141 | a-9 | 0.37 | 40 | 20 | 0.030 |
| Example 20 PVA-10 | 450 | 302 | a-9 | 0.61 | 40 | 30 | 0.040 |
| Example 21 PVA-11 | 450 | 997 | a-6 | 2.61 | 40 | 40 | 0.020 |
| Example 22 PVA-12 | 450 | 774 | a-10 | 1.70 | 40 | 40 | 0.020 |
| Example 23 PVA-13 | 450 | 348 | a-11 | 0.32 | 40 | 30 | 0.035 |
| Example 24 PVA-14 | 450 | 76 | a-11 | 0.19 | 40 | 20 | 0.035 |
| Example 25 PVA-15 | 450 | 714 | a-11 | 1.99 | 40 | 40 | 0.020 |

[1]Molar ratio of sodium hydroxide (NaOH) to vinyl acetate units of the polymer introduced

TABLE 4

| | PVA | | | Water resistance | |
|---|---|---|---|---|---|
| Type of PVA | Viscosity-average degree of polymerization | Amount of modification (mol %) | Degree of saponification (mol %) | Crosslinking agent | Elution ratio (%) |
| Example 26 PVA-9 | 1800 | 0.3 | 97.8 | Acrylate | 25.5 |
| Example 27 PVA-10 | 1100 | 0.5 | 98.4 | Acrylate | 16.3 |
| Example 28 PVA-11 | 400 | 3.0 | 85.5 | Acrylate | 21.0 |
| Example 29 PVA-12 | 500 | 2.0 | 84.6 | Acrylate | 16.7 |
| Example 30 PVA-13 | 1000 | 0.5 | 97.9 | Acrylate | 36.0 |
| Example 31 PVA-14 | 2400 | 0.3 | 97.6 | Acrylate | 23.4 |
| Example 32 PVA-15 | 500 | 3.0 | 87.0 | Isocyanate | 12.0 |
| Comparative Example 1 PVA-16 | 1700 | — | 98.5 | Acrylate | (Not measurable) |
| Comparative Example 2 PVA-17 | 1500 | — | 98.5 | Acrylate | (Not measurable) |

As shown in Tables 2 and 4, the vinyl alcohol polymer of the present invention having a mercapto group in its side chain is capable of exhibiting high water resistance by reaction between a common crosslinking agent and the introduced mercapto groups. As observed in Comparative Example 1, water resistance is not exhibited in the case of a vinyl alcohol polymer having no mercapto group introduced. In the case where a vinyl alcohol polymer has mercapto groups but the mercapto groups are present only at the molecular chain terminals as in Comparative Example 2, water resistance is not exhibited.

Fabrication of Coating Agent

Example 33

Into 210 g of distilled water was put 90 g of an aluminum hydroxide powder (HIGILITE H42 manufactured by SHOWA DENKO K.K.), followed by mixing to prepare a dispersion liquid A of aluminum hydroxide (aluminum hydroxide concentration: 30%). Separately, PVA-1 was dissolved in 95° C. hot water to prepare an aqueous PVA solution having a concentration of 10%.

Next, 60 g of the aqueous PVA solution was added to 26 g of the dispersion liquid A, and they were homogeneously mixed. Thereafter, 1.8 g of a polyamide polyamine epichlorohydrin resin ("WS 4020" manufactured by SEIKO PMC CORPORATION) was further added as a water resistance-imparting agent, followed by homogeneous mixing and then by adding ion-exchange water so that the solid content concentration was adjusted to 12%. In this manner, a coating agent was prepared. The viscosity stability and the water resistance of the obtained coating agent were evaluated by the methods previously described. The evaluation results are shown in Table 5.

Examples 34 to 42

The same procedures as in Example 33 were performed, except that PVA-3 to PVA-6, PVA-8 to PVA-10, and PVA-13 to PVA-14 were used instead of PVA-1 used in Example 33. The evaluation results are shown in Table 5.

Example 43

The same procedures as in Example 33 were performed, except that the amount of the dispersion liquid A used in Example 33 was changed to 26.6 g, and that 0.18 g of a polyfunctional acrylate compound ("NK Ester" A-400 manufactured by Shin-Nakamura Chemical Co., Ltd.) was further added as a water resistance-imparting agent in addition to the polyamide polyamine epichlorohydrin resin. The evaluation results are shown in Table 5.

Examples 44 to 46

The same procedures as in Example 43 were performed, except that PVA-3, PVA-13, and PVA-14 were used instead of PVA-1 used in Example 43. The evaluation results are shown in Table 5.

Example 47

The same procedures as in Example 33 were performed, except that the added amount of the polyamide polyamine epichlorohydrin resin was 1.2 g. The evaluation results are shown in Table 5.

Example 48

The same procedures as in Example 47 were performed, except that PVA-13 was used instead of PVA-1 used in Example 47. The evaluation results are shown in Table 5.

Comparative Example 3

The same procedures as in Example 33 were performed, except that an unmodified PVA (viscosity-average degree of polymerization: 1700, degree of saponification: 98.5 mol %) was used instead of PVA-1 used in Example 33. The evaluation results are also shown in Table 5.

Comparative Example 4

The same procedures as in Example 33 were performed, except that a carboxylic acid-modified PVA obtained by saponification of a copolymer of itaconic acid and vinyl acetate and having a degree of saponification of 98.0 mol %, a viscosity-average degree of polymerization of 1800, and an amount of modification of 2 mol %, was used instead of PVA-1 used in Example 33. The evaluation results are also shown in Table 5.

Comparative Example 5

The same procedures as in Example 33 were performed, except that an acetoacetyl-modified PVA (degree of saponification: 98.5 mol %, viscosity-average degree of polymerization: 1000, amount of modification: 5 mol %) was used instead of PVA-1 used in Example 33, and that 0.3 g of glyoxal was used instead of the polyamide polyamine epichlorohydrin resin. The evaluation results are also shown in Table 5.

Comparative Example 6

The same procedures as in Example 33 were performed, except that an acetoacetyl-modified PVA (degree of saponification: 98.5 mol %, viscosity-average degree of polymerization: 1000, amount of modification: 5 mol %) was used instead of PVA-1 used in Example 33. The evaluation results are also shown in Table 5.

TABLE 5

| | Type of PVA in coating agent | Property of coating agent Viscosity stability | Property of coating layer Water resistance |
|---|---|---|---|
| Example 33 | PVA-1 | Good | Good |
| Example 34 | PVA-3 | Good | Good |
| Example 35 | PVA-4 | Good | Good |
| Example 36 | PVA-5 | Good | Good |
| Example 37 | PVA-6 | Good | Good |
| Example 38 | PVA-8 | Good | Good |
| Example 39 | PVA-9 | Good | Average |
| Example 40 | PVA-10 | Good | Average |
| Example 41 | PVA-13 | Good | Good |
| Example 42 | PVA-14 | Good | Good |
| Example 43 | PVA-1 | Good | Good |
| Example 44 | PVA-3 | Good | Good |
| Example 45 | PVA-13 | Good | Good |
| Example 46 | PVA-14 | Good | Good |
| Example 47 | PVA-1 | Good | Good |
| Example 48 | PVA-13 | Good | Good |
| Comparative Example 3 | Unmodified PVA | Good | Poor |
| Comparative Example 4 | Carboxylic acid-modified PVA | Good | Poor |
| Comparative Example 5 | Acetoacetyl-modified PVA | Poor | Average |
| Comparative Example 6 | Acetoacetyl-modified PVA | Good | Poor |

As shown in Table 5, the coating agent of the present invention has excellent viscosity stability and storage stability when in the form of an aqueous coating solution. In addition, the coating agent allows formation of a layer excellent in water resistance on a paper surface while eliminating the need for a curing step subsequent to application of the coating agent to the paper.

INDUSTRIAL APPLICABILITY

The vinyl alcohol polymer of the present invention having a mercapto group in its side chain can be used in the same applications as conventional vinyl alcohol polymers. Examples of the applications include: coating agents for paper; paper modifiers such as internal sizing agents and pigment binders for paper; adhesive agents for wood, paper, aluminum foils, and inorganic materials; surfactants for various uses; non-woven fabric binders; paints; warp sizing agents; fiber processing agents; sizing agents for hydrophobic fibers such as polyester; various films, sheets, bottles, and fibers; thickeners; flocculants; soil modifiers; ion-exchange resins; and ion-exchange membranes. In particular, with the use of the vinyl alcohol polymer of the present invention having a mercapto group in its side chain, a coating agent that exhibits excellent water resistance and that is excellent in viscosity stability and storage stability can be provided. When the coating agent is used as a coating agent for paper, paper that has a layer excellent in water resistance and is suitable for various printing techniques such as offset printing and thermal printing can be produced with high productivity.

The invention claimed is:

1. A side-chain mercapto group-containing vinyl alcohol polymer comprising vinyl alcohol units and structural units represented by formula (I):

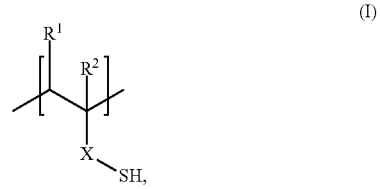

where $R^1$ is a hydrogen atom or a carboxyl group, $R^2$ is a hydrogen atom, a methyl group, a carboxyl group, or a carboxymethyl group, and X is a bivalent group represented by *—CO—NH—$X^1$—, where * represents a bond that binds —CO—NH—$X^1$— to a main chain of the polymer, and $X^1$ represents a bivalent aliphatic hydrocarbon group that comprises 1 to 20 carbon atoms and, optionally, at least one of a nitrogen atom and an oxygen atom, wherein when $R^1$ is a carboxyl group, the carboxyl group may form a ring with a hydroxyl group of an adjacent vinyl alcohol unit, and when $R^2$ is a carboxyl group or a carboxymethyl group, the carboxyl group or the carboxymethyl group may form a ring with a hydroxyl group of an adjacent vinyl alcohol unit.

2. The vinyl alcohol polymer according to claim 1, wherein structural units represented by the formula (I) are present in the polymer in an amount of 0.05 to 10 mol %, relative to 100 mol % of all structural units in the polymer.

3. A vinyl alcohol polymer composition comprising the vinyl alcohol polymer according to claim 1 and a water resistance-imparting agent, wherein the water resistance-imparting agent comprises at least one member selected from the group consisting of zirconyl nitrate, ammonium zirconium carbonate, zirconyl chloride, zirconyl acetate, zirconyl sulfate, aluminum sulfate, aluminum nitrate, titanium lactate, titanium diisopropoxybis(triethanolaminate), an acid anhydride, a divinyl sulfone compound, a melamine resin, methylol melamine, methylolated bisphenol S, a polyfunctional (meth)acrylate compound, a polyfunctional epoxy compound, an aldehyde compound, a polyfunctional isocyanate compound, a water-soluble oxidant, and a polyamide polyamine epichlorohydrin resin.

4. A method for producing a vinyl alcohol polymer according to claim 1, the method comprising copolymerizing a vinyl ester and an unsaturated monomer, that, when polymerized, results in structural units represented by the formula (I) in the polymer, and converting vinyl ester units of the copolymer to vinyl alcohol units.

5. A coating agent comprising the vinyl alcohol polymer according to claim 1.

6. The vinyl alcohol polymer according to claim 1, wherein $R^1$ is a hydrogen atom.

7. The vinyl alcohol polymer according to claim 1, wherein $R^1$ is a carboxyl group.

8. The vinyl alcohol polymer according to claim 1, wherein $R^2$ is a hydrogen atom.

9. The vinyl alcohol polymer according to claim 1, wherein $R^2$ is a methyl group.

10. The vinyl alcohol polymer according to claim 1, wherein $R^2$ is a carboxyl group.

11. The vinyl alcohol polymer according to claim 1, wherein $R^1$ is a carboxymethyl group.

12. The vinyl alcohol polymer according to claim 1, wherein $R^1$ is a carboxyl group and the carboxyl group forms a ring with a hydroxyl group of an adjacent vinyl alcohol unit.

13. The vinyl alcohol polymer according to claim 1, wherein $R^2$ is a carboxyl group and the carboxyl group forms a ring with a hydroxyl group of an adjacent vinyl alcohol unit.

14. The vinyl alcohol polymer according to claim 1, wherein $R^2$ is a carboxymethyl group and the carboxymethyl group forms a ring with a hydroxyl group of an adjacent vinyl alcohol unit.

15. The vinyl alcohol polymer according to claim 1, wherein the structural units represented by the formula (I) are present in the polymer in an amount of 0.1 to 7 mol %, relative to 100 mol % of all structural units in the polymer.

16. The vinyl alcohol polymer according to claim 1, wherein the structural units represented by the formula (I) are present in the polymer in an amount of 0.3 to 6 mol %, relative to 100 mol % of all structural units in the polymer.

* * * * *